United States Patent [19]

Moffatt

[11] 4,295,373

[45] Oct. 20, 1981

[54] FLUIDIC ANGULAR RATE SENSOR WITH INTEGRATED IMPULSE JET PUMP ASSEMBLY

[75] Inventor: E. Marston Moffatt, Glastonbury, Conn.

[73] Assignee: United Technologies Corporation, Hartford, Conn.

[21] Appl. No.: 137,109

[22] Filed: Apr. 3, 1980

[51] Int. Cl.³ .............................................. G01P 3/26
[52] U.S. Cl. .................................. 73/505; 73/516 R
[58] Field of Search ............ 73/516 R, 516 LM, 515; 417/322; 310/324, 348, 351

[56] References Cited

U.S. PATENT DOCUMENTS 3,361,067  1/1968  Webb ................................ 417/322
3,587,328  6/1971  Schuemann ................... 73/516 LM Primary Examiner—James J. Gill
Attorney, Agent, or Firm—Dominic J. Chiantera

[57] ABSTRACT

An angular rate sensor includes a unitary structure impulse pump for providing fluid under pressure, at a constant rate of flow, to a nozzle disposed at one end of a jet chamber to form a constant flow fluid jet, the jet chamber including a pair of temperature sensitive elements disposed at the other end in such a manner as to be differentially cooled by the fluid jet in dependence on the angular rotation of the sensor.

7 Claims, 2 Drawing Figures

FLUIDIC ANGULAR RATE SENSOR WITH INTEGRATED IMPULSE JET PUMP ASSEMBLY

DESCRIPTION

1. Technical Field

This invention relates to angular rate sensors, and more particularly to angular rate sensors of the fluid-jet deflection type having an impulse pump.

2. Background Art

Fluidic angular rate sensors of the jet deflection type are well known in the art. One which has found wide acceptance is the hot-wire anemometer type disclosed in U.S. Pat. Nos. 3,626,765 to Moore et al and 4,020,700, of common assignee herewith, to Lopiccolo et al. In each, balanced bridge temperature sensitive elements disposed at one end of a jet chamber housed within a fluid filled casing, are cooled differentially by a fluid jet in dependence on the Coriolis deflection of the jet during angular rotation of the sensor. In the presence of differential cooling a resultant bridge imbalance produces a differential signal whose magnitude is proportional to the angular velocity of the sensor. The absence of rotation, i.e. the null state, results in equal cooling of the elements and the differential output signal from the bridge is ideally zero.

The sensitivity (volts/degrees/second) and frequency response of the sensor are both dependent on the flow rate of the fluid jet. In both the Moore and Lopiccolo et al sensors the fluid jet is introduced into the jet chamber by a nozzle which receives the fluid under pressure from a jet pump assembly of the type described in U.S. Pat. No. 3,587,328 to Schuemann. This pump assembly includes a diaphragm comprising two piezoelectric material discs coated with a conductive metal film and bonded face to face to a central conductive plate with conductive epoxy. The diaphragm in turn is bonded along the periphery of one disc to one end of a cylindrical, centrally apertured flexible supporting element e.g. flexure, which is clamped at the other end within the sensor casing by a closure plate. The closure plate is epoxy bonded in place within the casing, and forms the end wall of the pump chamber formed by the internal diameter of the cylindrical flexure and the bonded diaphragm.

The piezoelectric discs are polarized to make the electrical axis (X-axis) of the disc perpendicular to the main plane (Y-Z axes), and the discs are mounted to the central plate such that their X-axes are oppositely poled. The diaphragm is electrically connected through the conductive coating into the regenerative loop of an oscillator. The applied AC voltage develops a bending moment on the diaphragm which causes the two discs to expand and contract oppositely on each alternating half cycle of the excitation signal. As a result the diaphragm oscillates, and in each cycle forces fluid from the pump chamber through a pump orifice along the sensor plenum to the jet nozzle, all of which is shown and described by Schuemann.

In the sensor configuration disclosed in Lopiccolo et al the impulse jet pump assembly is essentially identical, with the exception that the pump closure plate, termed an anvil in the '700 patent, is secured within the sensor housing by force of a conical spring held in compression against the anvil with a threaded annular lock nut which is tightened against the spring. This is in contrast to the Schuemann assembly where the closure plate (anvil) is secured within the sensor casing with epoxy. In either case, the anvil or closure plate clamps the support flexure of the pump in place by the force exerted against the support rim of the flexure.

In either pump assembly the diaphragm oscillates at its natural frequency, and the frequency together with the amplitude of displacement determine the cubic feet per minute (CFM) flow rate of the fluid jet in the chamber. The pump natural frequency value is dependent on a number of factors including the geometry of the diaphragm, the pump chamber, and the pump orifice, and also on the viscosity of the inert gas fluid. The displacement amplitude of the diaphragm (and the amplitude of the fluid pressure pulsations at the output of the pump orifice) is dependent on the damping coefficient of the pump assembly which has a value determined by the aggregate contribution of the various elements of the pump, including the manner in which they are joined to provide the complete assembly.

In either the Schuemann or Lopiccolo et al pump assemblies the damping coefficient for the pump varies with time. This is due primarily to the aging effects and temperature hysteresis of the epoxy bonds and the creep of the clamp mounted pump assembly within the casing. The change in damping coefficient changes the displacement amplitude and the flow rate of the fluid jet from that used in calibration of the sensor during manufacture. In addition, the epoxy used in bonding the pump elements in hygroscopic and absorbs moisture during manufacture. The diaphragm epoxy bonds are generally full of voids which collect moisture from the epoxy. This moisture is difficult to extract in the assembled unit, resulting in some degree of out-gassing from the diaphragm which contaminates the inert gas and produces an unstable fluid viscosity. This may cause a shift in the diaphragm frequency, further affecting the flow rate. Another effect of the moisture is to desensitize the filament wires which are sensitive to moisture levels as low as 10 ppm.

The mechanical clamping of the pump assembly with the axial, compressive force exerted by the anvil is subject to a large temperature hysteresis due to the differences in thermal expansion between the flexure, the anvil, and the sensor case. This causes slippage of the flexure with temperature resulting in variable stress levels in the flexure at different ambient temperatures; the variation and flexure stress providing a direct change in the damping coefficient. The clamped mounting also causes the flexure to be highly sensitive to any stresses of the casing, including those due to the mechanical mounting of the sensor in its final assembly and by changes in ambient temperature and pressure levels. In some instances the levels of case stress are sufficient to stop oscillation of the diaphragm.

All of these factors degrade the resolution accuracy of the sensor by attenuating the sensitivity and high frequency response. These type of fluidic angular rate sensors, due to the lack of rotating parts, have high utilization in applications which require the sensor to maintain calibration accuracy over long storage life intervals; as much as ten years. The aging and hysteresis effects arising out of these prior art pump assemblies effect the long term calibration accuracy of the sensor and may create errors of a mission-failing magnitude for the overall system in which it is used.

DISCLOSURE OF INVENTION

One object of the present invention is to provide an angular rate sensor with an impulse pump which is insensitive to casing stresses. Another object is to provide a sensor having a substantially constant fluid flow rate over the operating life and operating temperature and pressure ranges of the sensor.

According to one aspect of the present invention, the pump is provided as a unitary structure in which a piezoelectric diaphragm, a supporting flexure, and an anvil closure plate are metallurgically bonded together; the anvil being adapted to rigidly engage the inside mounting portion of the sensor casing, whereby the pump flexure and diaphragm are isolated from case stresses. According to another aspect of the present invention, the damping coefficient of the unitary pump structure is maintained constant over the life and operating range of the sensor by providing a diaphragm assembly in which the metal film coated piezoelectric discs are bonded together directly, with a metallurgical bond, eliminating the central conductive plate and the use of organic epoxy in the diaphragm assembly.

The improved angular rate sensor of the present invention provides improved reliability with a unitary structure in which all of the pump elements are joined with metallurgical bonds, providing an impulse pump which is self-supporting in the sensor housing, thereby eliminating pump sensitivity to external forces on the sensor and eliminating the effects of aging and hysteresis associated with the use of organic epoxy bonds. These and other objects, features and advantages of the present invention will become more apparent in light of the description of a best mode embodiment thereof, as illustrated in the accompanying drawing.

BEST MODE FOR CARRYING OUT THE INVENTION

Figure 2:
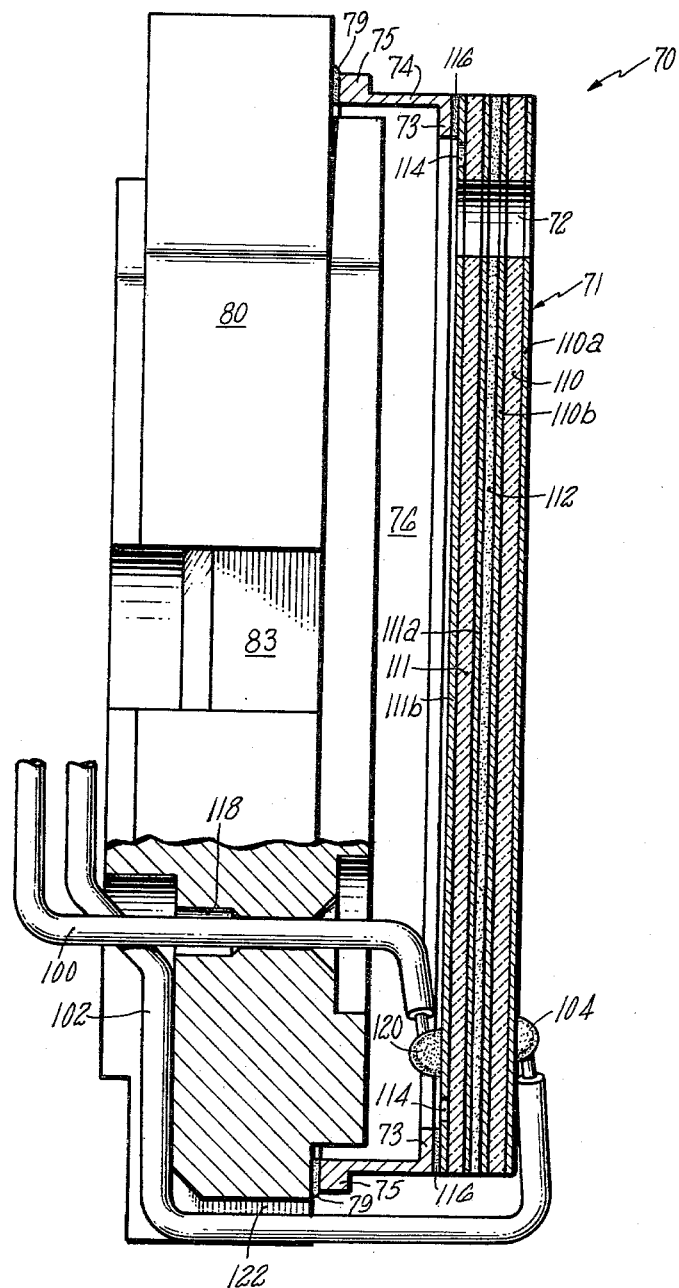
FIG. 2 is a partially sectioned, partially broken away side elevation view of the improved pump structure used in the sensor assembly of FIG. 1.

The present fluid jet angular rate sensor illustrated in FIG. 2 is identical, except for the improved impulse pump structure, to that disclosed in FIG. 2 of the hereinbefore referenced U.S. Patent to Lopiccolo et al. Only a simplified description of the sensor elements and operation is provided herein, as necessary for an understanding of the present invention, and common reference numerals are used where applicable to describe common elements in each.

As shown in FIG. 2, the sensor (not illustrated in scale) includes a thin-walled cylindrical casing 10 having an access end 11 and closed end 12. The access end 11 includes internal threads 15 for receiving a lock nut that secures the sensor internal components within the casing. The casing includes weld lips 17, 18 at each end. An end cover 16 is bead welded 19 to the lip 17 at the closed end to provide a hermetic seal with the casing and a similar bead weld 19 at the access end hermetically seals a header to the casing. The casing and other major components are of non-magnetic, anti-corrosive material, such as 300 Series Stainless Steel.

Internally, the sensor includes a cylindrical shape nozzle block 20 having two overall diameters associated with two different internal diameters of the casing resulting from the shoulder 13. The nozzle block 20 has a major annular groove 23 which with the case 10 forms a fluid manifold chamber 24 for receiving fluid under pressure from a feed port 25 formed in the wall of the groove 23. The nozzle block also includes: fluid feed tubes 26 which conduct the pressurized fluid from the feed manifold chamber to an inlet manifold chamber 27 formed between the nozzle block and the end cover 16, and a nozzle 28 disposed in the end wall of the nozzle block to provide a fluid conduit from the manifold chamber 27 into a jet chamber 29 formed as a major axial bore within the block. The nozzle block also has a pump mounting flange 37 including an internal counter bore 38, a wire feed through hole 39, and a plurality of mill slots (such as the slot 40) which may be used either for wire passageways or as a key for aligning the nozzle block within the casing.

The nozzle block further includes a counter bore 45 for seating a sensor plug assembly 50 in alignment with the nozzle in the jet chamber 29. The plug assembly includes exhaust ports 51 to permit the fluid flow through the plug into an exhaust chamber 52 formed in the pump mounting flange 37. The sensing elements, which are preferably tungsten wires 53, 54, are mounted to associated pairs of Kovar ® metal alloy posts (56, 57 for the element 53). The posts are secured in the plug through glass insulators 60 and the sensor elements are connected through insulated wires 61 (and posts 62) which may be routed through the milled slot 40 to the access end of the casing.

The impulse pump assembly 70, described hereinafter with respect to FIG. 1, includes a piezoelectric diaphragm 71 with a pump orifice 72. The diaphragm is metallurgically bonded to a mounting rim 73 of a flexible, cylindrical support flexure 74. The flexure has an oppositely directed support rim 75 at the other end which seats in the counter bore 38 of the nozzle block. In operation, the application of AC voltage to the piezoelectric diaphragm causes it to oscillate, producing fluid pressure pulsations in the pump chamber 76 formed internally of the flexure 74. These pulsations force fluid under pressure through the pump orifice 72, creating a fluid pressure concentration in the exhaust chamber 52. The exhaust chamber in turn forces the fluid through the feed port 25, the manifold 24, and the feed tubes 26 to the inlet manifold chamber 27 which supplies the nozzle 28. The flow rate of the fluid in cubic feet per minute (CFM) is dependent on the geometry of the pump chamber, the pump diaphragm, and the frequency of oscillation of the pump. The fluid velocity $V_p$ within the jet chamber is established by the cross sectional area (A) of the nozzle, or $V_p = CFM/A$.

In the present invention the support rim 75 of the flexure 74 is metallurgically bonded 79 to a mating surface of the closure plate, or anvil 80. The metallurgical bond, which may include a lead-tin solder bond, or a weld, completes the integral joining of the three major pump elements, i.e. the diaphragm 71, the flexure 74, and the anvil 80, into a unitary pump structure. The anvil 80 is sufficiently thick so as to withstand the large pressure pulsations within the pump chamber 76, which is formed by the mating surface wall of the anvil, the internal volume of the cylindrical flexure, and the mounted diaphragm. The anvil also includes internal feed through holes (FIG. 1) and milled wire clearance slots (83) which are complementary of the milled slots (40) in the nozzle block to facilitate electrical connection to the diaphragm. The unitary pump structure is seated in the nozzle block by the force applied to the rear surface of the anvil by a conical spring 88 which is under pressure from an annular lock nut 90 threaded into the internal threads 15 of the casing.

The header 94 welded to the access end of the casing includes feed through terminals 96 disposed in glass insulators 97 through the header, to permit electrical connection to the pump 70, the sensing elements 53, 54, and a pair of bridge balance resistors included in the casing (as disclosed by Lopiccolo et al). The connections to the pump are provided through wires 100, 102 soldered (104, 120) to either side of the piezoelectric diaphragm. The header also includes a fill tube 98 disposed in a fused glass sleeve 99 to permit filling the sensor with the fluid medium, i.e. an inert gas, such as helium.

Figure 1:
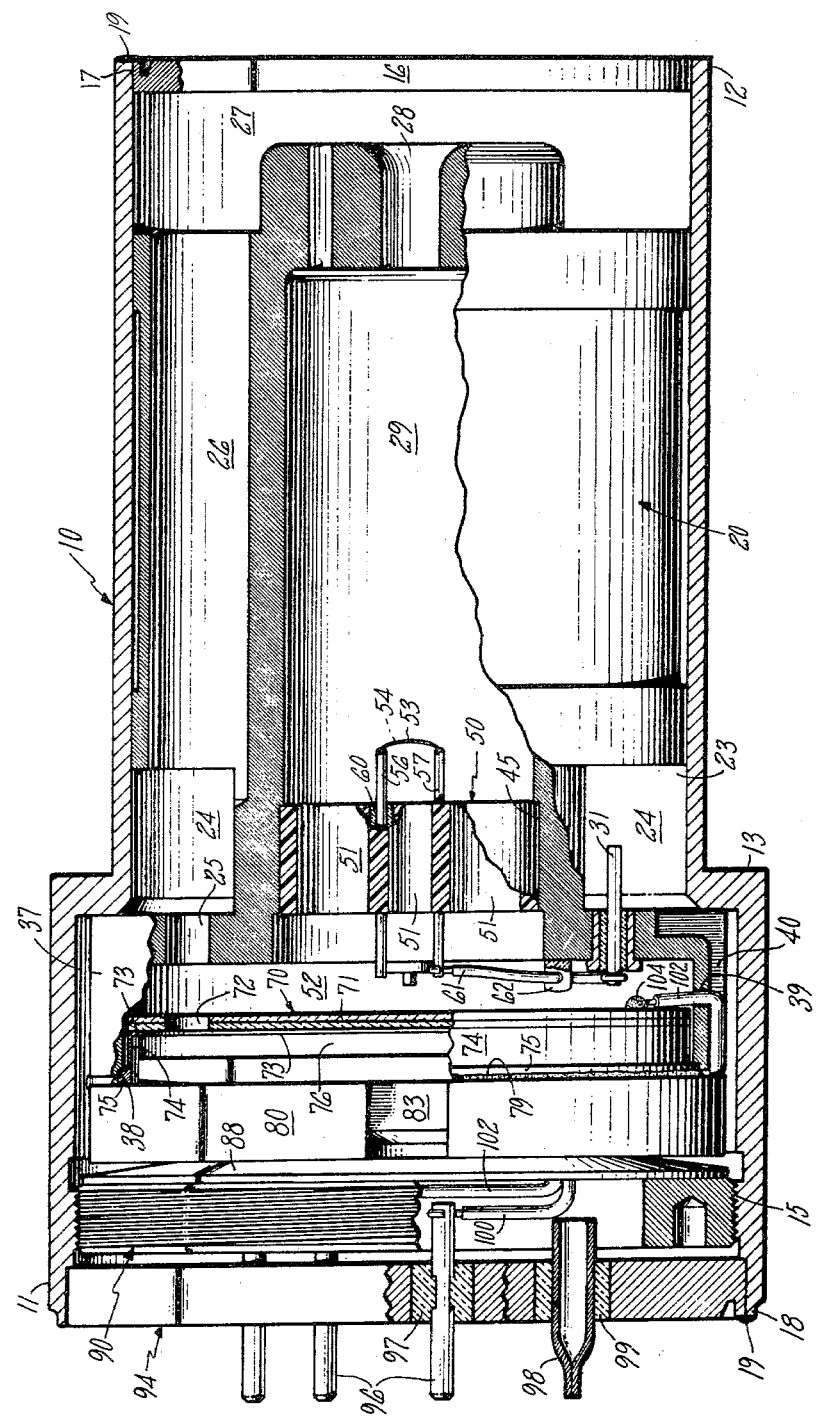
FIG. 1 is a partially sectioned, partially broken away side elevation illustrative view of the improved fluidic angular rate sensor of the present invention.

Referring now to FIG. 1, as stated hereinbefore the present unitary pump structure 70 cohesively joins the three major pump elements, i.e. diaphragm, flexure, and anvil, in one integral unit through metallurgical bonds between each element. This represents one aspect of the present invention. In addition a new diaphragm structure is provided which eliminates the use of the organic epoxy bond. The diaphragm 71 includes two polarized piezoelectric wafers 110, 111, each having an electrically conductive metal coating $110_a$, $110_b$ and $111_a$, $111_b$, on either side. The coating may comprise silver, nickel, or any other similarly conductive metal. The wafers are joined directly to each other in face to face relation along one of the conductive coated surfaces with a metallurgical bond 112. This bond provides cohesive joining of the wafers directly, without use of the center conductive plate, or brass vane used in the Schuemann and Lopiccolo et al pumps, and without the use of an organic type epoxy. The metallurgical bond is preferably lead-tin solder, however, any known metallurgical bonding technique such as diffusion or ultrasonic bonding, each using suitable metallurgical bonding materials may also be used. The metallurgical bond provides an essentially voidless bond, eliminating the cavities, or interstitial spaces of the prior art pump diaphragm assembly which create moisture traps that contribute to the hygroscopic characteristic of the prior art pumps. The use of a lead-tin solder bond permits X-ray examination of the assembled diaphragm to verify a uniform, voidless bond. Furthermore, since the lead-tin solder is itself nonhygroscopic internal voids in the central, or nonperipheral region of the assembled diaphragm are not of concern since they are sealed off from the internal fluid environment. It is only the peripheral voids which create the moisture trap cavities.

One limitation on the metallurgical bond process is the depolarization temperature of the piezoelectric crystal wafers. As stated before, the wafers are polarized along the X axis (electrical axis) perpendicular to the main plane (X-Z) of the diaphragm to permit an essentially radially symmetric expansion and contraction of the diaphragm when excited by the AC voltage signal. For piezoelectric wafers of lead-zirconium-titanate the depolarization temperature is in a range of from 550° to 600° F. (288° to 316° C.). Since the lead-tin solder melting point is less than half the depolarization temperature limit for the crystals it provides full assurance that no inadvertent depolarization will occur. However, any other type of metallurgical bonding, such as diffusion bonding, must take into account the particular piezo wafer depolarization temperature limits.

The metallurgical bond of the diaphragm wafers provides a more consistent, full strength bond which overcomes the aging and temperature hysteresis problems associated with the epoxy bonds. The present diaphragm is stiffer, so as to provide a substantially consistent damping coefficient, a low hysteresis, and it is nonhygroscopic so as to eliminate contamination and changes in the viscosity of the inert gas within the casing, all of which resulted in the variable CFM flow rate in the prior art pump assemblies. Since the damping coefficient determines the amplitude of the pressure pulsations from the pump and the cross sectional area of the fluid jet the new pump diaphragm permits a more stable null condition, i.e. zero signal output a zero angular rotation, in addition to a more repeatable sensor frequency response characteristic.

The diaphragm 71 is mounted to the support rim 73 of the support flexure 74 with a similar metallurgical bond 116. The bond 116 may include any of those types described hereinbefore with respect to the bond 112 between the piezoelectric wafers and again preferably is a lead-tin solder. This again due to the ease of providing such a solder bond in addition to the assurance that the actual bonding will not affect, or cause depolarization of, the wafers. The flexure 74 is preferably an iron-nickel alloy, such as an Invar ® alloy, with an essentially zero temperature coefficient of expansion. This allows for greater compatibility with the temperature coefficients of the piezoelectric wafers, thereby minimizing induced stress into the main plane (radial stress) of the diaphragm.

The anvil 80 is essentially identical to that disclosed by Lopiccolo et al, in terms of size and geometry, and the anvil material may comprise the same iron-nickel alloy as the flexure. The metallurgical bond 79 between the anvil and the flexure may include any of those described for the bonds 112, 116, or may be provided by a weld for higher strength. Since the anvil-to-flexure bond may be performed prior to the bonding of the diaphragm to the flexure, the higher temperature bonds may be used without concern over depolarization of the piezoelectric wafers. Alternately, the use of a resistance weld for the bond limits the heat generated by the weld to the immediate area of the bonded surfaces, thereby minimizing the concern over depolarization temperatures for the diaphragm.

The anvil-to-flexure bond provides the complete integral structure for the pump assembly. This allows the pump diaphragm to be relatively immune to external forces, or stresses exerted on the casing 10 which, in the prior art sensors resulted in a change in frequency or an actual stopping of the pump oscillation. The nonintegral structural nature of the prior art pump assemblies, where the flexure was held in place due to the compressive force exerted on the support rim 75 by the anvil, created the case sensitivity phenomena. The new unitary structure pump which is self-supporting by the anvil is not affected by the range in magnitude of case stresses present during normal operation of the sensor. In addition the metallurgical bond between the anvil and flexure is similarly nonhygroscopic and, therefore, does not provide a new source of contamination to the interior of the sensor.

The pump diaphragm 71 receives the AC electrical signal from the diaphragm oscillator (similar to that disclosed in Schuemann or Lopiccolo et al) through the wires 100, 102 which are routed through separate apertures in the anvil. The wire 100 is routed through an aperture 118 into the pump chamber 76 and connected through an electrical solder 120 to the surface $111_b$ of the chamber side wafer 111. The wire 102 is routed through a slot 122 in the anvil and slot 40 and hole 39 in the pump mounting flange 37, and is connected through a solder connection 104 to the surface $110_a$ of the top piezoelectric wafer 110. The location of the feed through apertures and slots 118, 122 in the anvil are identical to those described in the Lopiccolo et al patent, and allow electrical connection to the diaphragm near the edge rather than the middle of the diaphragm, so as to provide a minimum amount of damping to the diaphragm.

The unitary structure jet pump of the present invention may be used as a direct replacement for the existing pump assemblies since the geometry, i.e. diaphragm diameters, length and outside diameter of the flexure, and the anvil 80 may be made identical to those of the existing pump. This allows the remaining sensor assembly, including the locating keys for aligning the pump to provide registration of the pump orifice 72 with the fluid feed port (15, FIG. 2) of the nozzle block, to be identical to those described by Lopiccolo et al. For this reason the details of the assembly of the pump into the sensor are here omitted.

The unitary pump structure of the present invention provides for total integration of the diaphragm/flexure assembly to the anvil, thereby allowing the pump to be assembled separately from the sensor. This permits precise alignment of the pump elements, in addition to providing long term structural stability, i.e. no slippage of the flexure with respect to the anvil due to temperature cycling and case stresses. The use of all metallurgical bonds, eliminates the use of epoxy with its attendant unstable mechanical properties (temperature hysteresis and long term aging problems) and hygroscopic nature. This provides further assurance of pump performance in applications having long shelf life requirements.

The fabrication of the present pump is also simplified since there is no longer the dependency on the initial mix of the epoxy, or the protracted curing time required for the epoxy, both of which, if imprecise, contributed significantly to variation pump damping from unit to unit. The nonhygroscopic metallurgical bonds eliminate concern over internal voids in the diaphragm, and reduce, if not eliminate, the special drying procedures for the prior art sensors which involved cyclic purging of the sensor through the feed tube 98 at accelerated temperatures over total drying time period in excess of 200 hours.

Similarly, although the invention has been shown and described with respect to a preferred embodiment thereof, it should be understood by those skilled in the art that various changes, omissions and additions may be made therein and thereto without departing from the spirit and scope of the invention.

I claim:

1. An angular rate sensor, having:
a sealed, fluid filled casing for housing a nozzle block assembly having a jet chamber disposed therein, and for housing a jet pump assembly in registration with said jet chamber and connected for response to an external source of AC signals, said jet chamber including a nozzle and sensing elements disposed at opposite ends thereof, said sensing elements being cooled differentially in dependence on the angular rotation of the sensor, by a fluid jet formed by fluid forced under pressure through said nozzle by said pump assembly at a constant rate of flow provided by the improvement, comprising:
a unitary jet pump structure having a hollow cylindrical supporting flexure element cohesively joined with a metallurgical bond at one end to the periphery of a deformable piezoelectric diaphragm and cohesively joined with a metallurgical bond at the other end to a major surface of an anvil support means, said anvil means major surface providing the end wall of a pump chamber defined otherwise by the internal diameter of the cylindrical flexure and the diaphragm bonded to the other end thereof, said anvil support means being adapted to rigidly engage the casing internally for supporting said pump unitary structure in registration with said jet chamber within said casing.

2. The angular rate sensor of claim 1, wherein said metallurgical bonds joining said flexure element to said anvil support means and said piezoelectric diaphragm comprise lead-tin solder bonds.

3. The angular rate sensor of claim 1, wherein said metallurgical bond joining said cylindrical flexure element to said anvil support means comprises a weld, and said metallurgical bond joining said flexure element to said piezoelectric diaphragm comprises a lead-tin solder bond.

4. The angular rate sensor of claim 1, wherein said deformable piezoelectric diaphragm comprises:
a pair of piezoelectric material wafers, each having two parallel major surfaces defining a main plane therein, each of said major surfaces having an electrically conductive film disposed thereon, said wafers being joined directly to each other with a metallurgical bond along one of said major surfaces of each, another one of said major surfaces of each being connected for response to the external source of AC signals, said bonded wafers including a pump orifice therethrough for providing fluid communication between said pump chamber and said nozzle.

5. The angular rate sensor of claim 4, wherein said metallurgical bond between said piezoelectric material wafers comprises a lead-tin solder bond.

6. The angular rate sensor of claim 4, wherein:
said piezoelectric wafers are each polarized along a common, electrical axis perpendicular to said main plane; and wherein
said piezoelectric wafers are bonded along the similarly polarized major surfaces of each, whereby the electrical axes of each wafer of said pair are oppositely poled in the diaphragm assembly.

7. The angular rate sensor of claim 4, wherein:
said piezoelectric wafers are each polarized along a common, electrical axis perpendicular to said main plane; and wherein
said bonded piezoelectric wafers are oriented with respect to their direction of polarization so as to provide for an opposite strain to be induced in each wafer in response to the external source AC signal presented thereto, said oppositely induced strain in each wafer providing for a periodic bending of said diaphragm at a frequency equal to that of the applied AC signal.

* * * * *